United States Patent [19]

Egami et al.

[11] Patent Number: 4,922,392
[45] Date of Patent: May 1, 1990

[54] AN ORIGINAL READING APPARATUS WITH SHIELDING

[75] Inventors: Hidemi Egami, Zama; Katsuo Saito, Yokohama; Hiroshi Satomura, Hatogaya; Katsuya Oikawa, Yokohama, all of Japan

[73] Assignee: Canon Kabushiki Kaisha, Tokyo, Japan

[21] Appl. No.: 279,235

[22] Filed: Nov. 29, 1988

Related U.S. Application Data

[63] Continuation of Ser. No. 944,863, Dec. 22, 1986, abandoned.

[30] Foreign Application Priority Data

Dec. 25, 1985 [JP] Japan ............................ 60-201741[U]
Mar. 28, 1986 [JP] Japan .................................. 61-71976
Aug. 8, 1986 [JP] Japan ........................... 61-122313[U]

[51] Int. Cl.$^5$ .............................................. F21S 3/00
[52] U.S. Cl. .................................... 362/217; 362/218; 362/221; 355/30; 355/67; 355/71
[58] Field of Search ................. 313/313; 315/82, 248; 355/30, 67, 71; 362/97, 217, 218, 220, 221, 264, 294

[56] References Cited

U.S. PATENT DOCUMENTS

| | | | |
|---|---|---|---|
| 2,348,617 | 5/1944 | Furedy | 362/217 |
| 3,807,856 | 4/1974 | Rodriguez | 355/67 |
| 4,287,554 | 9/1981 | Wolff | 362/218 |
| 4,477,863 | 10/1984 | Walz | 362/221 |

FOREIGN PATENT DOCUMENTS

| | | | |
|---|---|---|---|
| 135867 | 10/1980 | Japan | 355/71 |
| 171964 | 9/1984 | Japan | 355/30 |

Primary Examiner—Noah P. Kamen
Attorney, Agent, or Firm—Fitzpatrick, Cella, Harper & Scinto

[57] ABSTRACT

An illumination device for causing a discharge tube to emit a light by applying a high frequency electromagnetic field thereto from outside including a high frequency wave oscillating circuit, a discharge tube, and a shield for shielding the oscillating circuit and the discharge tube to prevent the adverse effect of high frequency noise. When used in an original reading apparatus of the movable optical system type, the portion of the illumination device from the high frequency wave oscillating circuit to the discharge tube is reciprocally moved as a unit with the shield.

19 Claims, 13 Drawing Sheets

AN ORIGINAL READING APPARATUS WITH SHIELDING

This application is a continuation of application Ser. No. 944,863 filed December 22, 1986, now abandoned.

BACKGROUND OF THE INVENTION

1. Field of the Invention

This invention relates to an illumination device in which a discharge tube is caused to emit a light by a high frequency electromagnetic field being applied to the discharge tube from the outside thereof.

The invention further relates to an original reading apparatus for reading the image of an original by moving the illumination device in which the discharge tube is caused to emit a light by extraneous application.

2. Related Background Art

Fluorescent lamps and halogen lamps have heretofore been widely used in original reading apparatuses and usual illumination.

A fluorescent lamp produces visible light and, wavelength of the it can emit a selected wavelength by selection of a fluorescent material and is the preferred illumination source. But if a great current is applied to the filament to obtain a great quantity of light, the filament will be immediately burnt out and therefore, the quantity of light obtained is low. Also, if a current flows to the filament, deterioration will progress due to the excited gas in the discharge tube and thus, the service life of the filament itself is short.

As compared with a fluorescent lamp, a halogen lamp can provide a great quantity of light, but as shown in FIG. 24 of the accompanying drawings, it produces a great deal of light in a wavelength range other than visible light. That is, a halogen lamp produces a great deal of light not used in an original reading apparatus or an apparatus utilizing chiefly the wavelength range of about 400-800 nm such as a copying apparatus having a photosensitive medium, and therefore is low in power efficiency. Also it produces light by converting electrical energy into heat, and this leads to a great deal of heat generation.

In view of such problems, a light source has been developed which utilizes the discharge phenomenon like a fluorescent lamp and which has a much higher brightness and a much longer service life than a fluorescent lamp. Such a light source applies energy to a discharge tube from the outside thereof, as and is known from Japanese Laid-Open Patent Application Nos. 98457/1980 and 249,240/1985.

FIG. 23 of the accompanying drawings is a cross-sectional view of an example of such a light source. In FIG. 23, reference numeral 4 designates a lamp to the inner surface of which a fluorescent material 3 is applied and in which mercury and an inert gas are enclosed. The lamp 4 is formed with a cylindrical portion 7 protruding so as to include a transformer 2. The transformer 2 comprises a core 6 and a coil 5, and the ends of the coil 5 wound around the core 6 are connected to a high frequency lamp source 1.

By a high frequency voltage being applied from the high frequency lamp source 1 to the coil 5, a high frequency electromagnetic field is produced around the coil 5. The electrical energy of this electromagnetic field excites the mercury gas in the lamp 4, and the ultraviolet rays of the mercury produced by this excitation are changed into a visible light by the fluorescent material 3 applied to the inner surface of the lamp 4.

Such a light source utilizes the discharge phenomenon and can provide a light of an appropriate wavelength range by the selection of the fluorescent material and does not have a filament emitting heat electrons, but utilizes electromagnetic field energy applied by an electrode provided in contact with the outer wall of the discharge tube and therefore permits the application of a great amount electric power, and is of high brightness and enjoys a long service life because the electrode is not exposed to the excited gas in the discharge tube.

However, while such a light source has the merits of high brightness, long service life and good power efficiency, it suffers the adverse effects of high frequency noise because of its utilizing a high frequency wave. Thus, where such an illumination device utilizing a high frequency electromagnetic field is used in an apparatus having electronic parts such as an original reading apparatus, there has arisen a problem that the device malfunctions or does not operate.

SUMMARY OF THE INVENTION

It is an object of the present invention to provide an illumination device in which the adverse effect of high frequency noise is prevented and therefore it can be used in an original reading apparatus for reading the image of an original by moving the illumination device.

It is another object of the present invention to provide an original reading apparatus of the movable optical system type which can suppress a temperature rise while preventing high frequency noise and can be made light in weight.

It is still another object of the present invention to provide an original reading apparatus in which high frequency noise is prevented and which is free from fluctuations in the quantity of light during the scanning of an original.

Further objects of the present invention will become apparent from the following detailed description.

DESCRIPTION OF THE PREFERRED EMBODIMENTS

Figure 1:
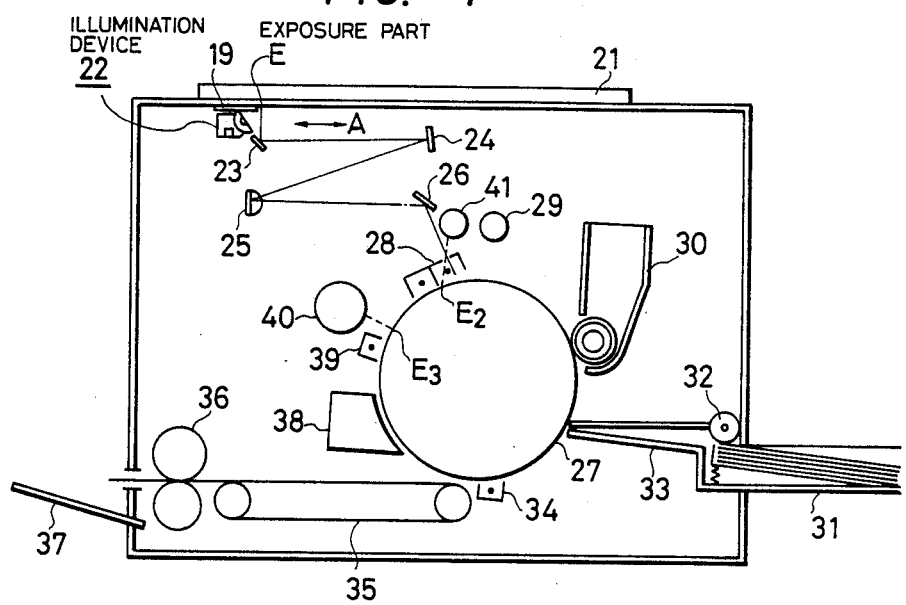
FIGS. 1 and 21 are cross-sectional views of copying apparatuses provided with an original reading apparatus to which an embodiment of the present invention is applied.

Some embodiments of the present invention will hereinafter be described with reference to the drawings throughout in which functionally similar members are given similar reference numerals.

FIG. 1 is a cross-sectional view of a copying apparatus provided with an original reading apparatus to which the present invention is applied.

In FIG. 1, reference numeral 21 desigsted an original supporting cover, and reference numeral 22 denotes an illumination device according to the present invention. The illumination device 22 is movable in the directions of bilateral arrow A with a first mirror 23, and cooperates with a second mirror 24 movable also in the directions of bilateral arrow A to form a so-called 2-to-1 optical system. Reference numeral 25 designates an in-mirror lens, and reference numeral 26 denotes a third mirror which slit-exposes an original to thereby project the optical image of the original onto a photosensitive drum 27. Reference numeral 28 designates primary and secondary chargers for forming a latent image on the photosensitive drum having an insulating layer on the surface thereof. The primary and secondary chargers are constructed as a unit. The aforementioned optical image is exposed simultaneously with secondary charging. Further, an electrostatic latent image is formed on the surface of the drum 27 by means of a whole surface exposure lamp 29. Designated by 30 is a developing device for visualizing the thus formed latent image.

On the other hand, cut paper sheets as recording materials in a paper supply stacker 31 are fed one by one by a pick-up roller 32, and the cut paper sheet thus fed passes along a paper supply guide 33 and the visible image on the drum 27 is transferred to the cut paper sheet by a transfer charger 34, whereafter the cut paper sheet is conveyed by a conveying part 35 to a fixing device 36, at which the image on the cut paper sheet is fixed, and then the cut paper sheet is discharged onto a paper discharge stacker 37.

Any developer left on the drum 27 after the image transfer step is removed by a cleaner 38, and to eliminate the electrical image left on the photosensitive medium, the drum 27 is de-electrified by a charge eliminator 39 and a charge eliminating lamp 40 and restores its original condition. Reference numeral 41 designates a blank exposure lamp for forming the light portion of the latent image to prevent development from taking place during the backward movement of the optical system. In FIG. 1, E, $E_2$ and $E_3$ denote exposure parts.

Of course, in the present embodiment, the illumination device of the present invention can be used not only as an original illuminating device but also as the charge eliminating lamp 40 or the blank exposure lamp 41.

The photosensitive medium is not restricted to one of a three-layer structure having an insulating layer on the surface thereof, but any medium sensitive to light, such as a photosensitive medium of a two-layer structure comprising an electrically conductive layer and a photoconductive layer, or photosensitive paper, is applicable.

A description will now be provided of the illumination device 22 which is an embodiment of the present invention.

Figure 2:
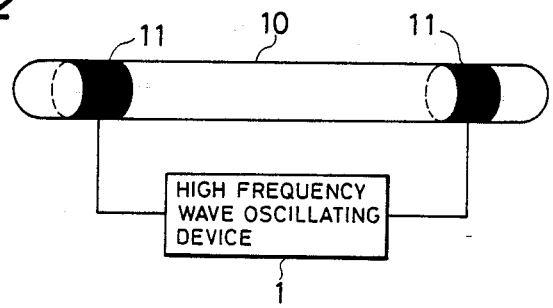
FIG. 2 shows a discharge tube and the shape of electrodes in an embodiment of the present invention.

FIG. 2 shows a discharge tube and the shape of electrodes in the present embodiment.

In FIG. 2, reference numeral 1 designates high frequency wave oscillating means, and reference numeral 10 denotes a discharge lamp. The glass of the discharge lamp is a conventional soda-lime glass or Pyrex glass, and a predetermined fluorescent material is applied to the inner surface of the glass. Further, mercury and inert gas are enclosed in the discharge lamp.

As shown, the lamp is of a tubular shape which is a shape preferable as a light source used for the slit exposure of an original reading apparatus. Reference numeral 11 denotes electrodes provided on the opposite end portions of the discharge lamp which are connected to the high frequency wave oscillating means. The electrodes 11 cover the peripheral surface of the lamp at those end portions. The material of the electrodes 11 may be any ordinary conductor, and preferably copper or stainless steel which is less subject to oxidation. The surface of this conductor is coated with an insulating material having a thickness of the order of 0.5 mm.

When a high frequency voltage is applied between these electrodes, the mercury gas is excited by the produced high frequency electric field, and ultraviolet rays produced simultaneously therewith are changed into a visible light by the fluorescent material applied to the inner wall of the discharge lamp.

According to such construction, light is uniformly emitted lengthwise from the discharge lamp, and the lamp is of high brightness and has a long service life and is therefore very effective as the illumination source of an original reading apparatus.

Figure 3:
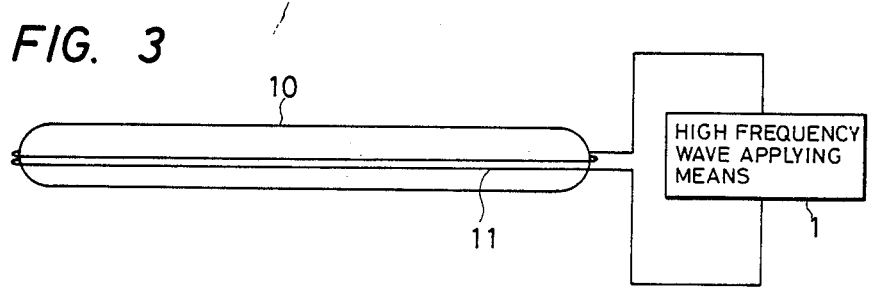
FIGS. 3 and 4 show the shape of an electrode according to the present invention.

FIG. 3 shows another shape of the electrode. An electrode is wound in the shape of a coil lengthwise on the discharge tube near the center thereof. Winding the electrode lengthwise on the discharge tube near the center thereof is preferable to provide a good discharging condition. According to this shape, it is possible to apply a higher electric power to the electrode than according to the shape of FIG. 2, and preferably, even higher brightness is obtained. Also, in an illumination device wherein an electrode is thus brought into contact with the outer wall of the discharge tube and the high frequency electromagnetic field provided by this electrode is utilized, the high frequency wave used may preferably be $10^6$–$10^8$ Hz when the increases in brightness and power efficiency are taken into account.

The electrode may be closely spaced apart from the discharge tube, but may preferably be in contact with the discharge tube.

The illumination device 22 will now be described in detail with reference to FIG. 4 which is a cross-sectional view of the present embodiment using the electrode shape of FIG. 3.

Figure 4:
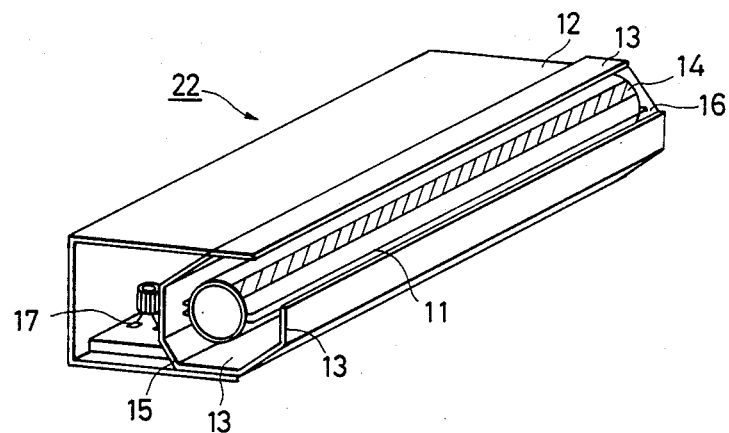

In FIG. 4, reference numerals 12 and 13 designate shields for shielding an electromagnetic wave, and the side of the device is also covered with shields, not shown. A reflecting plate 15 is provided between a high frequency lamp source, not shown, which is provided in the shield 12 and the discharge lamp, and the inner surfaces of the shields 13 are also reflective, and direct the light beam from the discharge lamp to the opening portion 16 of the shields.

The electrode 11 passes through the interior of the shields and is connected to the terminal 17 of the high frequency lamp source.

The discharge lamp has a slit portion having no fluorescent material applied thereto at a location opposed to the opening portion, and from there, an intense light beam travels toward the opening portion 16.

All the shields are formed of a conductor and, on the high frequency lamp source side, noise such as electromagnetic wave produced simultaneously with the production of a high frequency wave is electro-magnetically shielded. Further, making the reflecting plate 15 also electrically conductive is preferable in that the electromagnetic shielding effect is enhanced.

Also on the discharge tube side, the noise from the electrode 11 to which a high frequency voltage is applied is electromagnetically shielded by the electrically conductive shields 13 and reflecting plate 15. Further, these electrically conductive shields enhance their electromagnetic shielding effect by being grounded, and this is preferable.

The opening portion 16 will now be described.

If this opening portion 16 is too large, the shielding effect will be reduced and therefore, the width of the opening in a direction orthogonal to the lengthwise direction of the discharge tube should desirably be in such a range that noise is almost completely shielded.

Figure 5:
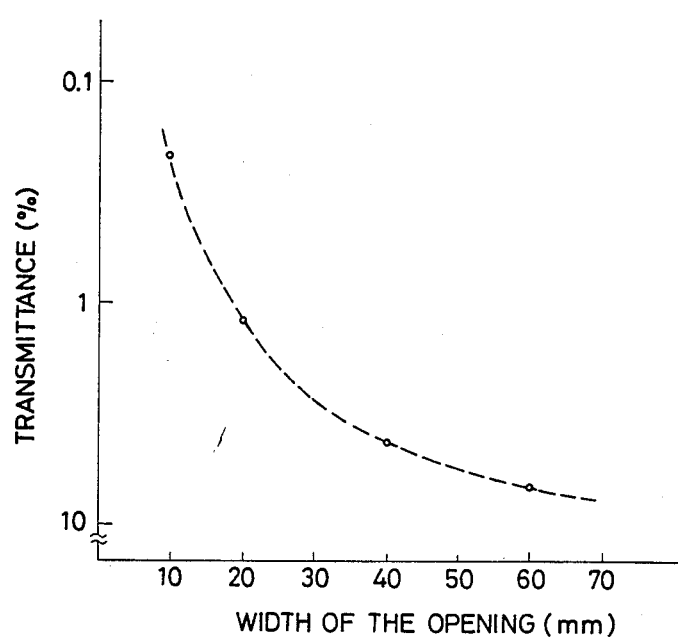
FIG. 5 is a graph of the relationship between the width of the opening in the shields in the present invention and the transmittance of the noise from the shield.

FIG. 5 is a measurement data graph showing the relation between the width of the opening and the transmittance of the noise from the shield when a high frequency power of 20 MHz and 100 W was applied to a discharge tube having a length of 30 mm and a diameter of 25 mm.

As shown in FIG. 5, as the width of the opening becomes smaller, the transmitted noise is decreased, and the transmittance of the noise is remarkably decreased when the width of the opening is 30 mm or less. Such a characteristic somewhat differs depending on the frequency used and the length of the tube, but where the discharge tube is used at a tube length of about 450 mm or less and a power of 200 W or less required by the ordinary original reading apparatus, the width of the opening may preferably be 30 mm or less, and may more preferably be 3 mm or more because if the width of the opening is too small, the width for and slit-exposure of the original will be insufficient.

Also, as previously described, when viewed from the viewpoints of power efficiency and light emission efficiency, the frequency may preferably be $10^6$–$10^8$ Hz, and may more preferably be $10^6$–$4 \times 10^7$ Hz because if the frequency becomes high, the overall amount of produced noise will increase although the shield effect is obtained.

Figure 6A:
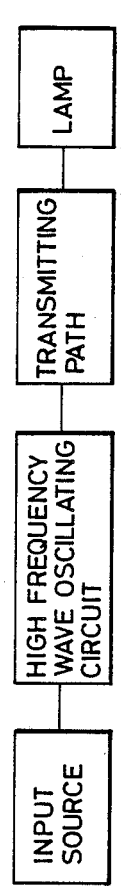
FIGS. 6A, 6B, 6C, and 6D are illustrations of the present invention in its exposed state and in various shielded states.
Figure 6B:
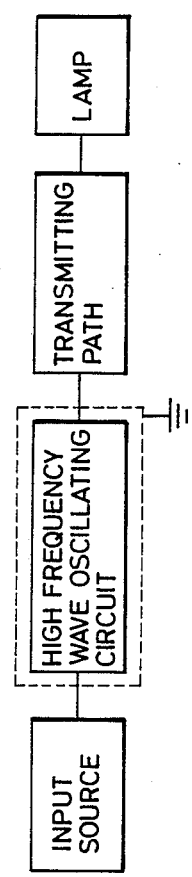
Figure 6C:
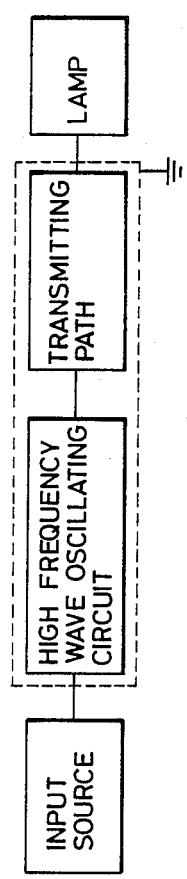
Figure 6D:
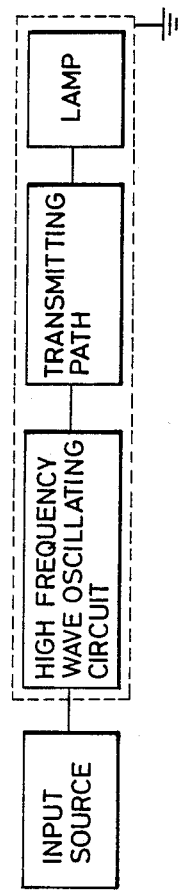
Figure 7:
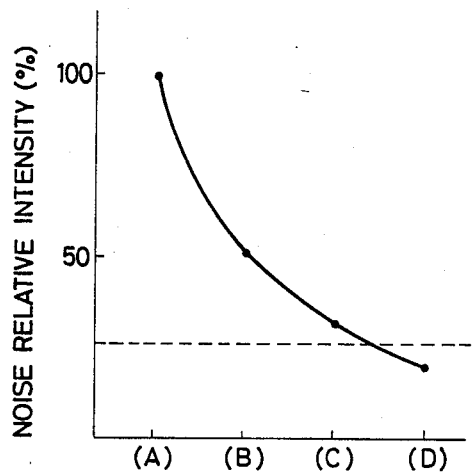
FIG. 7 is a graph of the noise relative intensity when the invention is in its exposed state and the various shielded states shown in FIGS. 6A–6D.

FIG. 7 is a graph illustrating the effect of the present invention. In FIG. 7, (A)–(D) of the abscissa correspond to the block diagrams (A)–(D) of FIG. 6, in which the dotted lines represent the shield, which is grounded.

The discharge tube had a length of 250 mm and a diameter of 30 mm, and a high frequency power of 20 MHz and 100 W was supplied to the electrode shown in FIG. 3.

FIG. 6A shows the illumination device in its exposed state. The noise relative intensity in this state is 100%.

FIG. 6B refers to a case where only the high frequency wave oscillating circuit is shielded by a conductor and grounded. The noise is thereby sharply decreased and improved to 50%, but does not reach the dotted line in FIG. 5 which is the standard level of the noise.

FIG. 6C shows a case where the high frequency wave oscillating circuit and the transmitting path are shielded. The noise approaches the standard level, but cannot completely clear the standard.

FIG. 6D shows the illumination device of FIG. 1 according to the present embodiment. The high frequency wave oscillating circuit to the lamp are shielded and the noise is completely under the standard level and thus, there is obtained a noiseless light source of high brightness.

Thus, in the present invention, the noise is under the standard level and does not adversely affect the original reading apparatus.

In an illumination device wherein a high frequency electromagnetic field is thus extraneously applied to the discharge tube, the high frequency noise produced from the transmitting path including the electrode and from the discharge tube is great.

Where such an illumination device is used in the original reading apparatus as shown in FIG. 1, it is very difficult to fix the high frequency wave oscillating circuit and reciprocally move the discharge tube. That is, great noise is produced from a high tension cable for movably connecting the high frequency wave oscillating circuit and the electrode provided in contact with the discharge tube. Also, a high frequency voltage greatly suffers from a loss in the high tension cable and therefore, if the applied power is increased, noise will be further increased.

So, in the present invention, the portion from the high frequency wave oscillating circuit to the discharge tube which is concerned with a high frequency wave is made into a shielded unit and this unit is moved, whereby the noise from the transmitting path is also shielded. Also, in such case, the electrode and the high frequency wave oscillating circuit are brought close to each other and therefore, the loss in the transmitting path is small and particularly, it is preferable to directly connect the high frequency wave oscillating circuit and the discharge tube without the intermediary of a high tension cable.

A description will now be provided of a driving mechanism for reciprocally moving the illumination device 22.

Figure 8:
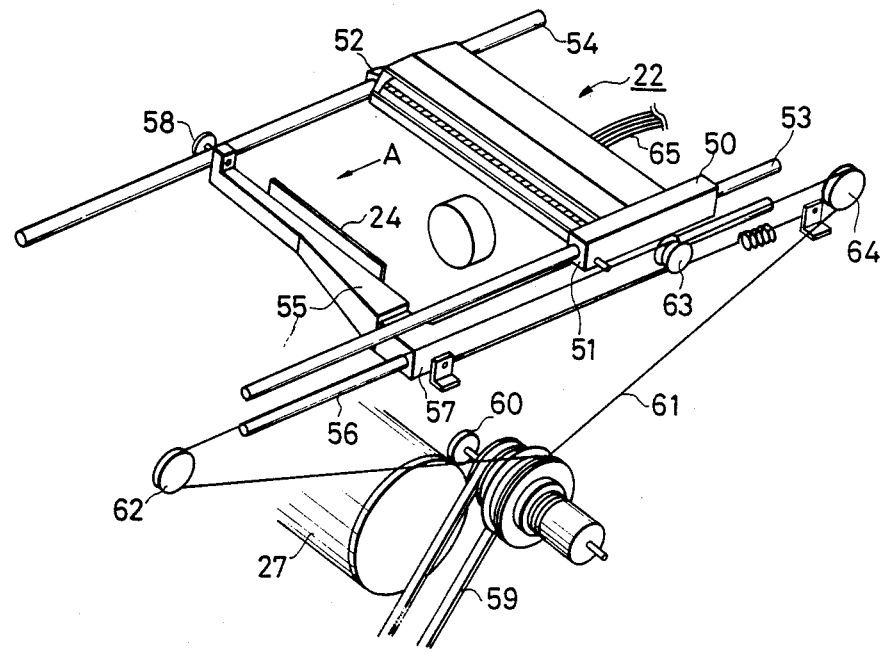
FIG. 8 shows a perspective view of the mechanism for driving the illumination device of the present invention.

FIG. 8 is a perspective view of the driving mechanism. The illumination device 22 shown in FIG. 4 which is supported on a support member 50 is movably supported on guide rails 53 and 54 through slide bearings 51 and 52. The second mirror 24 and a second mirror carrier 55 supporting it are supported on guide rails 54 and 56 through a slide bearing 57 and a ball bearing 58. When the drive force from a motor, not shown, is transmitted to a belt 59, the photosensitive drum 27 is rotated through the intermediary of a gear 60 and also, the illumination device 22 and the second mirror 24 are moved at a speed ratio of 2:1 in the direction of arrow A through the intermediary of wire 61 and pulleys 62, 63 and 64. When they are to be returned after completion of the scanning, the motor, not shown, is revolved in a reverse direction. Designated by 65 is a power source cord movably provided to a low frequency input source connected to the high frequency wave oscillating circuit and fixed to the device.

Figure 9:
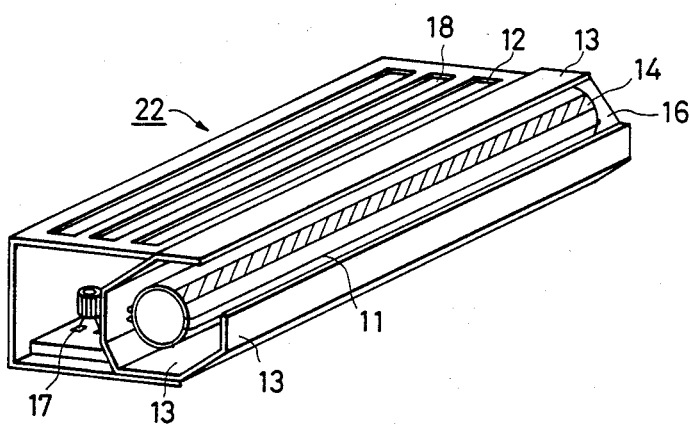
FIGS. 9, 10 and 11 are cross-sectional views of embodiments of the present invention.

FIG. 9 is a cross-sectional view of another embodiment of the present invention.

Electrically conductive plastic or a high molecular material having a metal laminated thereon is employed as the shield material.

The electrically conductive plastic comprises electrically conductive metal fiber or metal powder dispersed in high molecules. A material which is light in weight and excellent in mechanical length, such as nylon 6, polypropylene or polycarbonate, is suitable as the base plastic, and iron fiber, brass fiber, aluminum powder or the like is suitable as the filler for dispersion.

The use of the electrically conductive synthetic resin with high molecules as the base as described above as the shield material, instead of a metallic material such as aluminum or stainless steel, preferably leads to a great vibration absorbing property and non-occurrence of any vibration during the scanning of the original in an original exposure and illumination device of the movable type which results from the light weight of the material, and thus leads to the possibility of the surface of the original being uniformly illuminated.

Also, this shield is provided with a slit-like opening 18.

This opening 18 preferably leads to the achievement of a further light weight as well as a cooling effect and heat radiation effect of the high frequency wave oscillating circuit which is weak to heat. Particularly in the type in which the illumination device is moved, the movement of a further cooling effect.

Where the shield is formed of the aforementioned synthetic resin, the working of the opening is easy and of course, this is preferable.

The opening 18 may preferably be provided in opposed relationship with the high frequency wave oscillating circuit having a semiconductor, etc.

Further, the opening 18 should preferably be formed to such a degree that high frequency noise hardly leaks therefrom, as previously described in relation to the opening 16 through which the light from the discharge tube passes. Thus, the cooling effect of the lamp side is obtained and any reduction in illuminance by increased heat is prevented.

Figure 10:
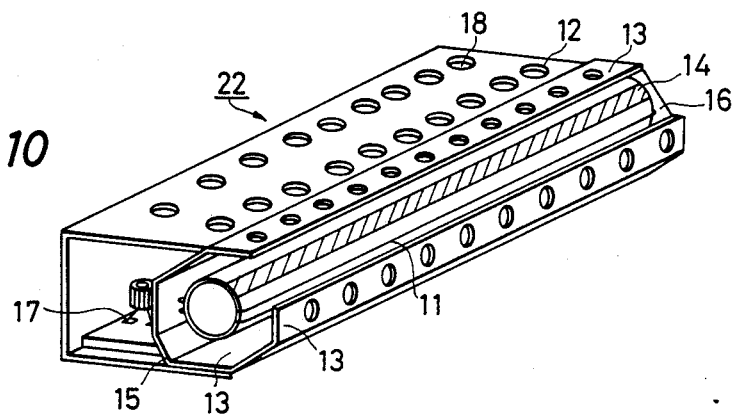

FIG. 10 shows still another embodiment in which the opening 18 is in the form of circular spots. This embodiment results in an effect similar to that of the FIG. 9 embodiment.

The slit and spots seen in FIGS. 9 and 10 have such a size that can shield the electromagnetic wave produced by the high frequency wave, and such size is set so as to perform noise control.

In FIG. 10, the reflecting plate is also provided with openings, but these openings should preferably be formed that they do not mar the reflecting effect of the reflecting plate. Further, if design is made such that a concentrated light beam is produced from an aperture 14 which does not require the reflecting plate, it will become effective to provide openings in the shield plate which is adjacent to the lamp. In such case, a coating material for inwardly reflecting the produced light will be applied to the portion of the discharge tube other than the aperture. This also can be realized as by covering the exterior of the discharge tube (the portion other than the aperture) with a metal.

Figure 11:
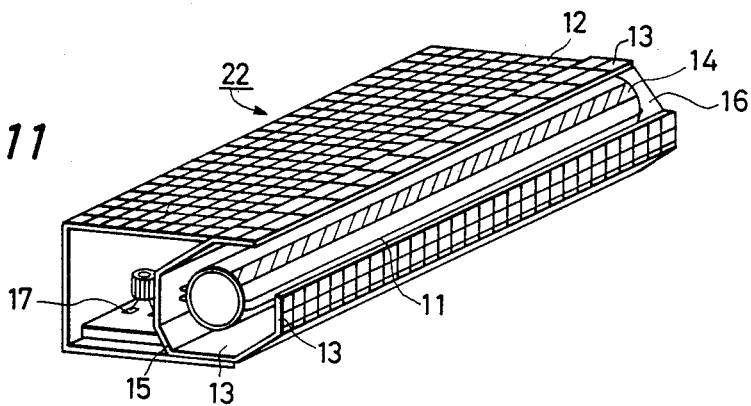

FIG. 11 shows yet still another embodiment of the present invention in which the shield member is provided in a mesh shape by a metal. This embodiment can achieve a further light weight. Further, as described above, the mesh shape is of course provided so finely as not to mar the noise preventing effect by being shielded by an electromagnetic wave.

Figure 12:
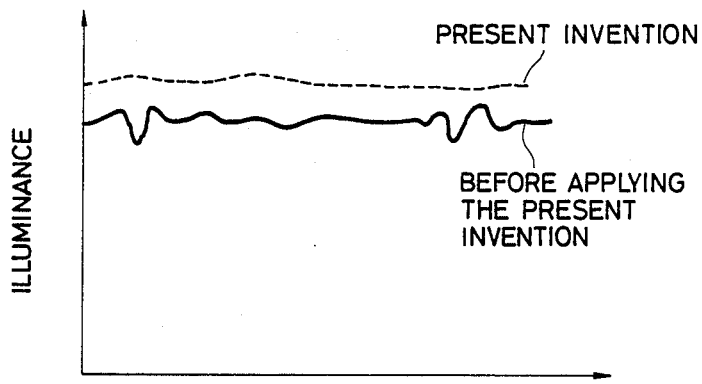
FIG. 12 is an illustration of the increased illuminance when the present invention is used.

FIG. 12 illustrates the effect of the present invention and shows the case where the illumination device is moved along an original supporting table. In FIG. 12, the ordinate represents illuminance and the abscissa represents the position of the surface of the original supporting table in the scanning direction. The dotted line indicates the case where the shield member is made light in weight as in the present invention, and the illuminance of the surface of the original supporting table is almost uniform. However, where the shield member is not made light in weight (solid line), the illuminance of the surface of the original supporting table is fluctuated by the vibration of the illumination device during the scanning and a uniform image cannot be obtained.

Such vibration is encountered especially during the exposure of an original in a high-speed copying apparatus, and this is because of the insufficient torque of the optical system driving motor for moving the illumination device and because the vibration is not absorbed.

Such a vibration problem can be solved by the use of a large motor of great torque and a vibration absorbing material such as Dypeer, but inconveniently this will encounter the problems of bulkiness of the device, increased cost and increased power consumption.

Also, in FIG. 12, illuminance is improved by the present invention, and this is because the discharge tube and the high frequency wave oscillating circuit depend on temperature and the cooling effect has been enhanced and has thereby approached the peak value of the temperature characteristic.

In the above-described embodiment, it is preferable to make the opening 16 small to such a degree that high frequency noise hardly leaks, but it is sometimes desired to make the opening large in order to secure a great exposure width of the slit exposure. Also, the amount of high frequency noise is varied by a variation in the impedance of the discharge tube and therefore, to further ensure that the noise is shielded, the opening could be subject to a mesh treatment or an electrically conductive light-transmitting sheet in the opening could be provided, but this would lead to a reduced quantity of light.

A description will now be provided of a preferred embodiment which can shield noise more reliably.

The inventors have further studied the occurrence of noise and have found that until the discharge tube is turned on, much noise is liable to occur and after the discharge tube is turned on, high frequency noise decreases remarkably.

Figure 13:
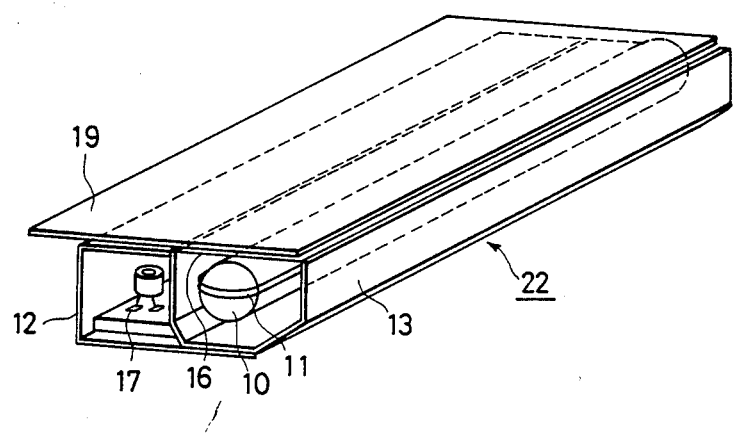
FIGS. 13, 14 and 15 are cross-sectional views of embodiments of the present invention.

FIG. 13 is a cross-sectional view of another embodiment based on this observation.

The opening 16 is shielded by a shield 19 fixed to the device as shown in FIG. 1, particularly attached to the lower portion of the original supporting table.

Before the discharge tube is turned on, the opening 16 is shielded in the above-described state by the shield 19.

When an original reading signal, not shown, is input, a high frequency voltage is applied to an electrode 11 through a terminal 17. When the discharge tube is turned on, the illumination unit starts to scan an original and the opening 16 becomes spaced apart from the shield 19, and a light beam is applied to the original.

The shield is all formed of an electrically conductive material and is grounded, and noise such an electromagnetic wave is shielded.

By the opening 16 being thus further shielded during the of the discharge tube, not only is the prevention of noise further ensured, but also the opening can be made larger than would otherwise be the case.

It is preferable from the view points of reducing the loss of power and shielding the noise, that the high frequency wave oscillating circuit and the transmitting path be placed on the illumination unit.

This embodiment has been described with respect to the so-called movable original supporting table type, but of course, what has been described above is also possible with the movable original supporting table type. In this construction, the shielding of the opening 16 by the shield 19 is accouomplished by the scanning of the original and therefore, preferably, the construction is very simple and reliable.

Figure 14:
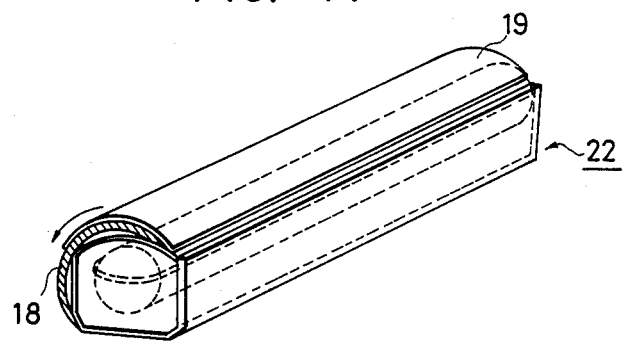

FIG. 14 shows another embodiment in which when the discharge tube is turned on and, a shield 19 is moved along a guide 18 by an unshown driving mechanism such as a plunger.

Figure 15:
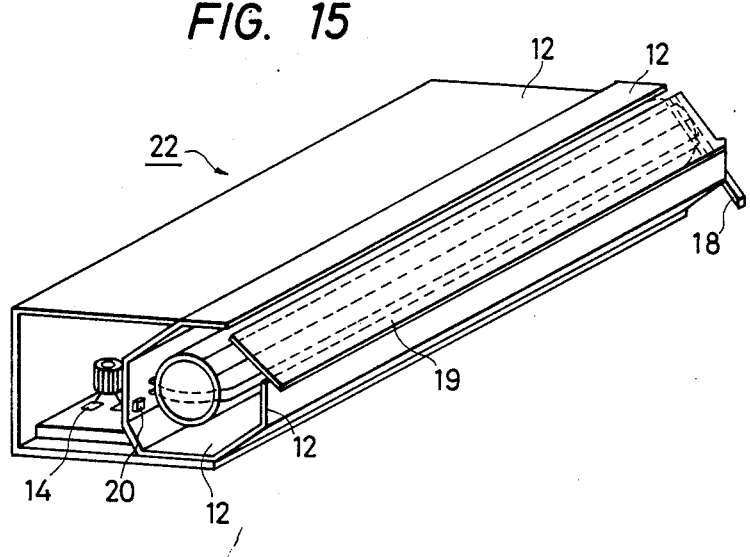

FIG. 15 shows still another embodiment in which a shield 19 provided in the opening of the illumination unit 22 having a high frequency power source therein and completely shielded except for the opening is moved in the direction of arrow along a guide 18. This construction is effective to shield any noise increased by an unexpected accident during any time, i.e., even during the scanning.

The operation timing of the shield 19 will now be described. (Hereinafter, the shield 19 will be referred to as the shutter.)

Figure 16:
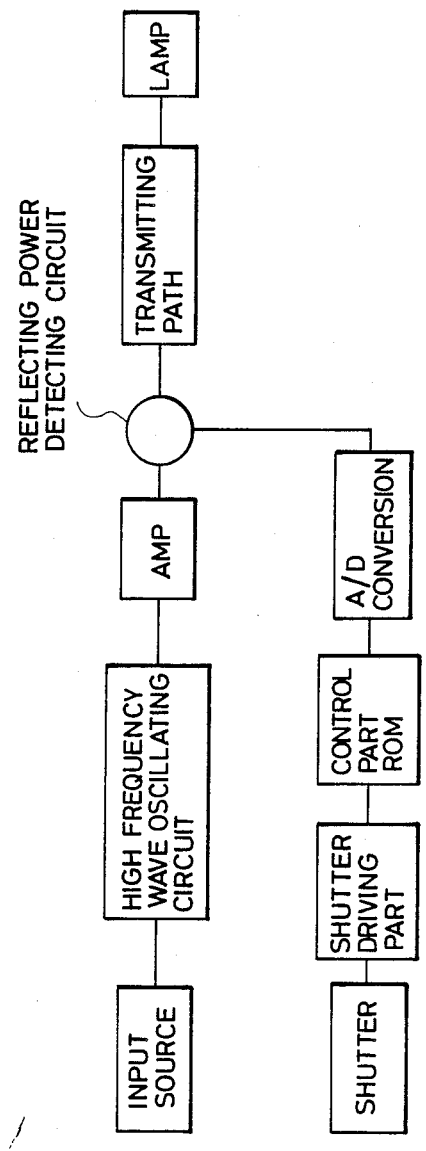
FIG. 16 is a block diagram for illustrating an embodiment of the present invention.

FIG. 16 is a block diagram showing the circuit construction. In FIG. 16, an amplifier for amplifying the electric power is provided between the high frequency wave oscillating circuit and the transmitting path.

The reflecting power is detected by a reflecting power detecting circuit between the amplifier and the transmitting path. This reflecting power is the main cause of noise. This reflecting power is A/D-converted and compared with a predetermined value predetermined by a control part, and when the A/D-converted value becomes smaller than the predetermined value, the shutter is released and the scanning of the original is started.

Figure 17:
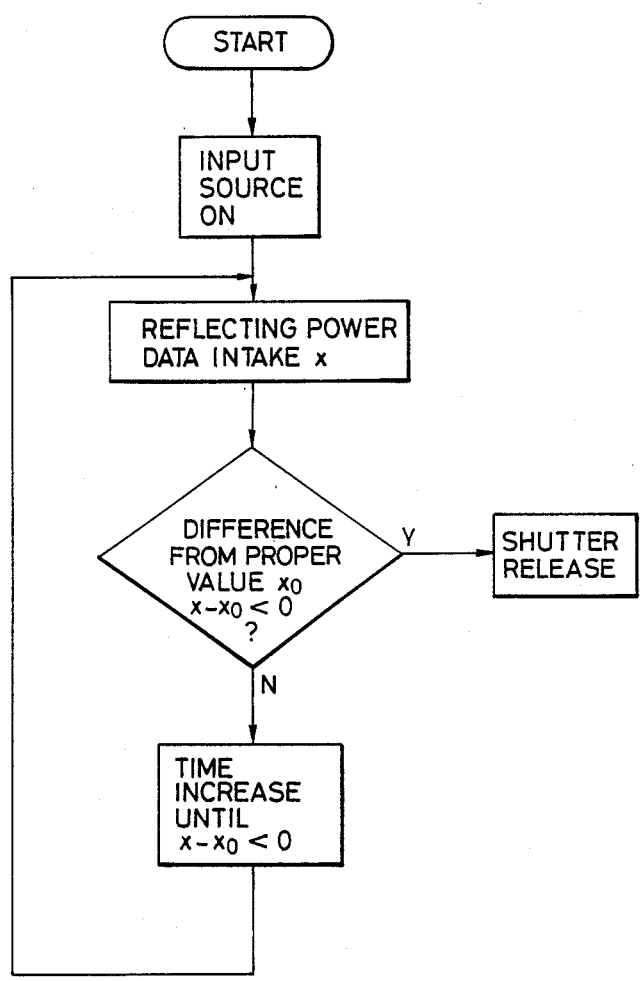
FIG. 17 is a flow chart illustrating an embodiment of the present invention.

This sequence is shown in the flowchart of FIG. 17.

Of course, the shutter release includes the fact that in the embodiment of FIG. 1, the illumination unit 22 starts to scan.

When the scanning of the original is terminated and the illumination unit and the original return to their predetermined relative position, the opening is again covered with the shutter. This shutter need not cover the opening during the time that the discharge tube is turned on, but may be designed to cover the opening as soon as or after the discharge tube is turned off.

As described above, control of the shutter and the scanning of the original has been effected by detecting the reflecting power, whereas this is not restrictive, but as shown in FIG. 15, an intensity-of-light detecting sensor 20 may be provided in the shield of the discharge tube so that shutter release may be effected when a predetermined intensity of light is reached, or the rising-up time of the discharge tube may be predetermined and shutter release may be effected after the lapse of this predetermined time.

The effect of this embodiment will now be described with reference to FIG. 18.

Figure 18A:
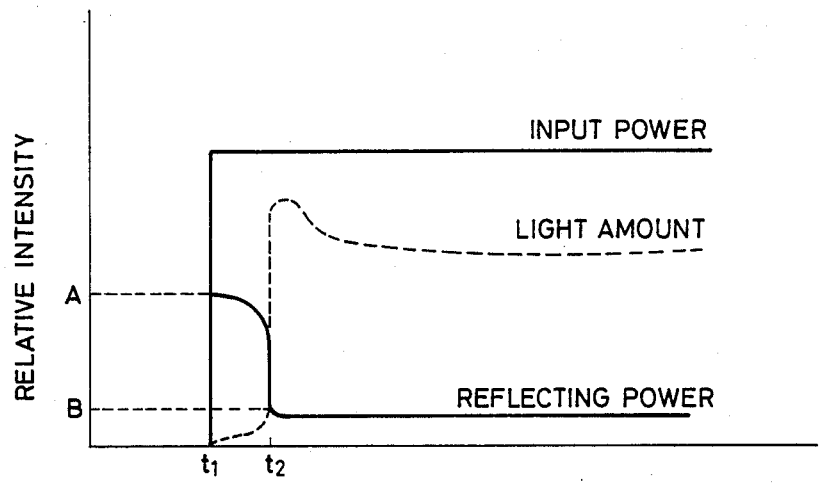
FIGS. 18A and 18B are illustrations of graphs showing the relationship between relative intensity and time, and relative noise intensity and time, respectively of the present invention.
Figure 18B:
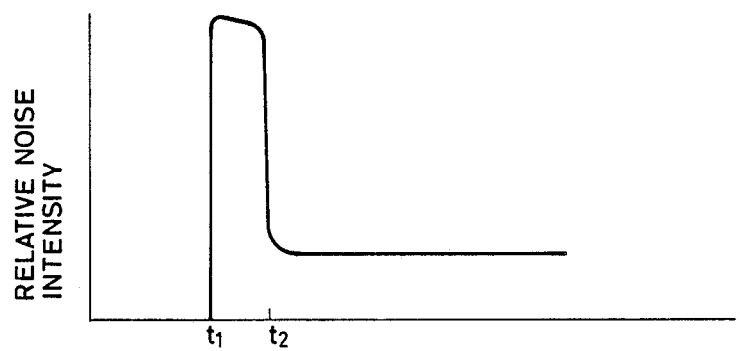

FIGS. 18A and 18B illustrate the present invention and show the input power, the reflecting power and the relative noise intensity. In these Figures, the abscissa represents time.

A description will first be made with reference to FIG. 18a.

The discharge tube and electrode used are of the shapes shown in FIG. 5.

When a power is input at time $t_1$, the reflecting power is about one-half of the input power as indicated by A in FIG. 18A, and this provides great noise.

When the discharge tube discharges at time $t_2$, the reflecting power decreases sharply as indicated by B in FIG. 18A.

As described above great noise is produced from the discharge tube before it discharges, but after the discharge, the noise from the discharge tube becomes very small, namely, is at a practically fair level.

In the present invention, during the period $t_1$ to $t_2$ during which the noise is great, the noise is shielded and does not leak outwardly and therefore, malfunctioning or non-operation of the original reading apparatus is eliminated.

A description will now be provided of a more preferred embodiment in achieving the higher speed of the original reading apparatus.

When the speed of movement of the illumination device 22 becomes higher, the influence of the cold air flowing from the opening into the discharge tube becomes great. During the scanning of the original, the discharge tube is cooled down by this cold air and this temperature change causes irregularity in the quantity of emitted light during the scanning, which in turn has led to a problem that irregularity of reading is caused.

Figure 19:
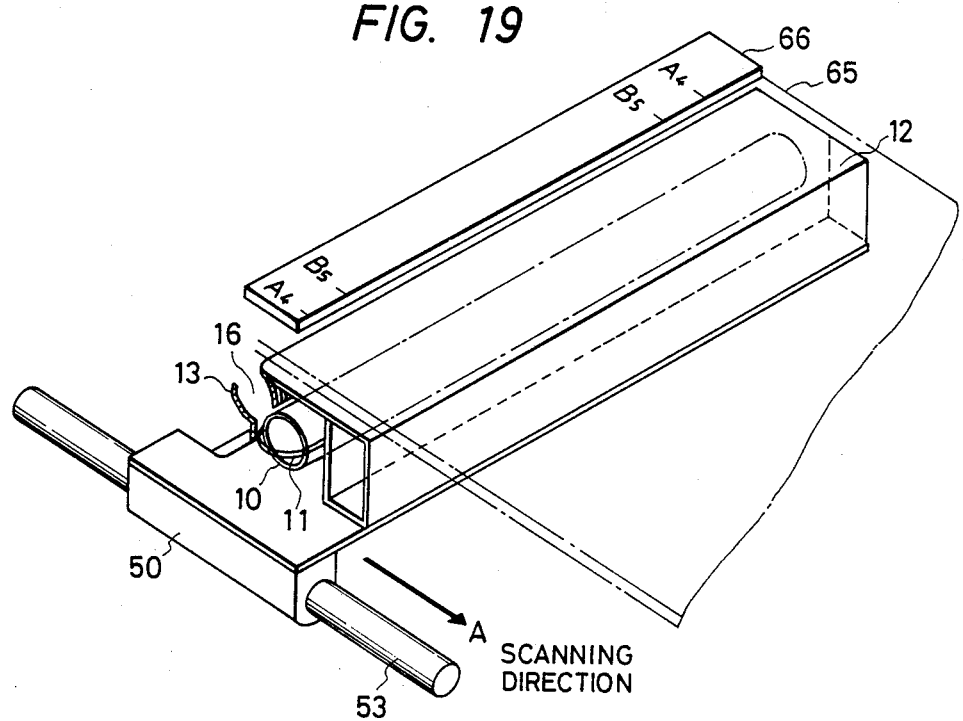
FIG. 19 is a cross-sectional view of another embodiment of the present invention.

FIG. 19 shows another embodiment.

The surface 65 of an original is irradiated by a shield 13 serving also as a light condensing member which is provided in an opening 16. As shown in FIG. 8, the illumination device scans the surface 65 of the original through a guide 53 and reads the original.

The opening 16 faces the upstream side with respect to the scanning direction A during the reading of the original. Thus, during high-speed scanning, cold air does not directly flow into the discharge tube and any fluctuation of the quantity of light by the temperature change during the scanning is prevented.

The cooling of the discharge tube is sufficiently effected during the return of the device and thus poses no problem.

Figure 20:
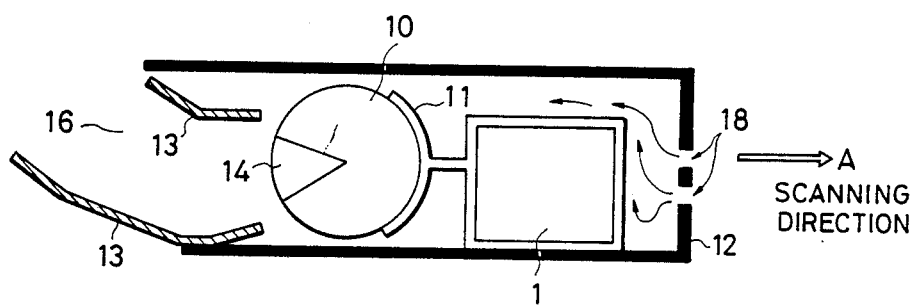
FIG. 20 is a simple enlarged cross-sectional view of the illumination device portion of the FIG. 19 embodiment.

FIG. 20 is a cross-sectional view for illustrating the illumination device in more detail.

High frequency wave applying means provided with a high frequency oscillating circuit is provided downstream of the discharge tube with respect to the original scanning direction A. By such construction the degree of freedom of the design of the opening is improved.

Also, an opening 18 as shown in FIGS. 9 and 10 is provided at a position opposed to the high frequency wave applying means 1 of the shield 12, particularly a position opposed thereto downstream with respect to the scanning direction. Air can flow between the opening 18 and the opening 16 through which light passes.

When the discharge tube and the high frequency wave applying means are to be cooled down by the air stream between the openings 16 and 18, the present embodiment is especially effective.

That is, during the scanning of the original, the cold air from the opening 18 opposed to the high frequency wave applying means cools the high frequency wave applying means and the air which has thus risen in temperature comes into contact with the discharge tube and therefore, during the scanning of the original, the discharge tube is not suddenly changed in temperature by the cold air. Also, during the scanning, the high frequency wave applying means is cooled down and therefore, the circuit efficiency during the scanning is stable and good.

During the return, as previously described, the discharge tube is sufficiently cooled down by the cold air passed through the opening 16 and will never abnormally rise in temperature even during continuous scanning.

The effect of the present invention is sufficiently obtained for a scanning speed of 100 m/s, and is particularly remarkable for 200 m/s or higher.

Figure 21:
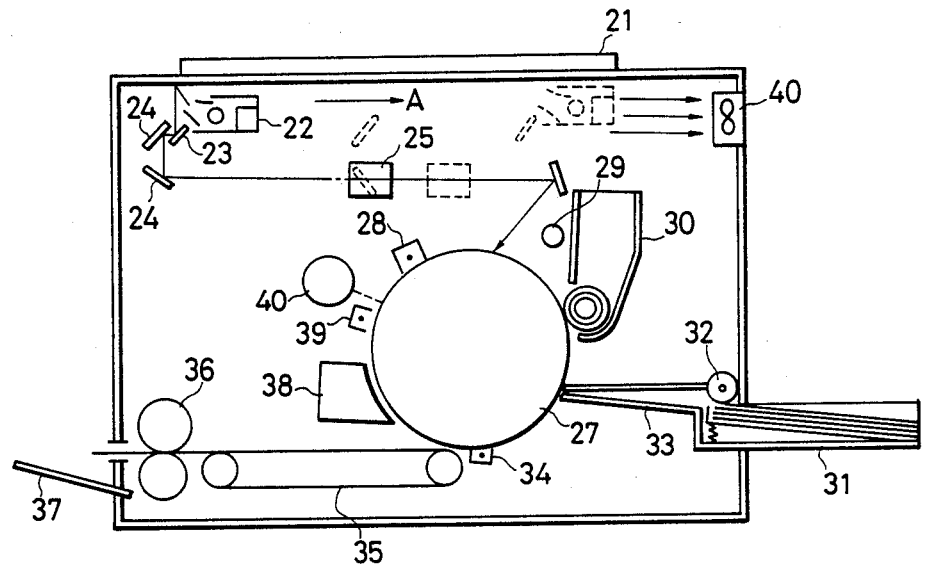

FIG. 21 is a cross-sectional view of a copying apparatus provided with an original reading apparatus to which the embodiment of FIGS. 1 and 2 is applied. FIG. 21 is generally similar to FIG. 1 and a detailed description thereof is omitted.

The solid lines indicate the standby position of the illumination device 22, and when a copy signal is input, the discharge tube is turned on and the illumination device starts to scan in the direction of arrow A.

The dotted lines indicate the scanning termination point, from which the illumination device returns to the solid-line position.

Reference numeral 40 designates a suction fan for cooling the optical system. The suction fan 40 forms an air stream in the same direction as the scanning direction. As described just above, the direction of this air stream is the same as the scanning direction and therefore, during the scanning of the original, this air stream does not sharply cool the discharge tube, but conversely cools it sufficiently during the return.

Figure 22:
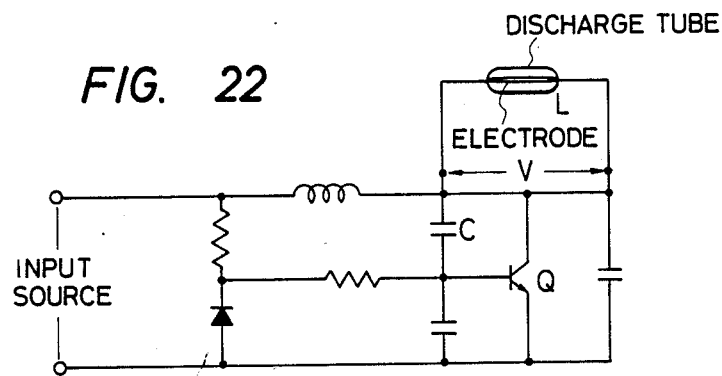
FIG. 22 is a circuit diagram of an embodiment of the high frequency wave oscillating circuit of the present invention.
Figure 23:
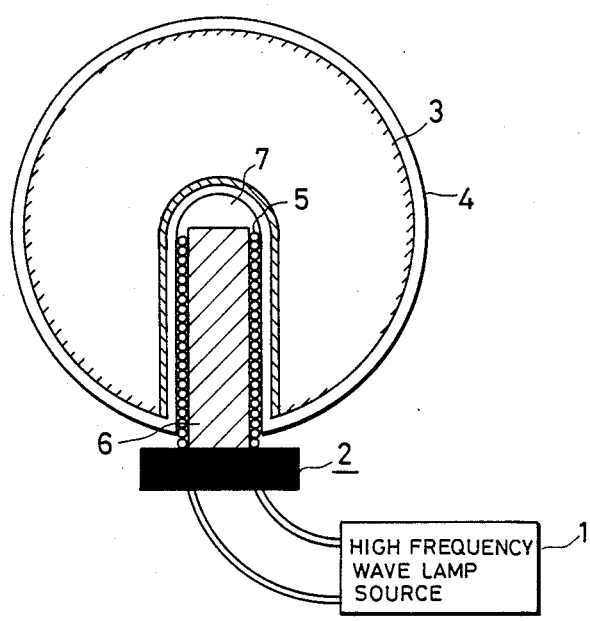
FIG. 23 is a cross-sectional view of an example of the prior art.
Figure 24:
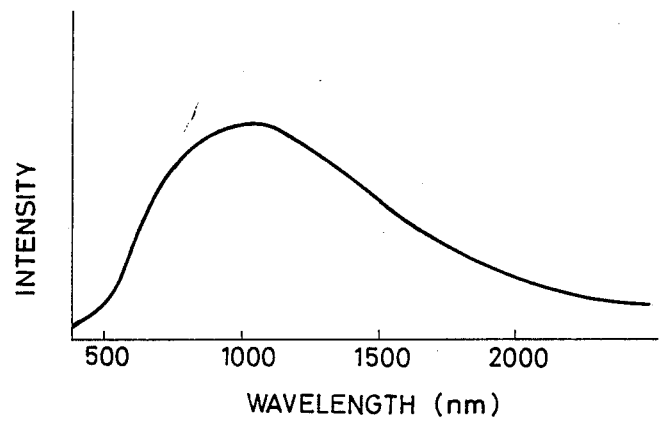
FIG. 24 is an illustration of the relationship between intensity and wavelength in a halogen lamp.

FIG. 22 shows an example of the high frequency wave oscillating circuit.

The voltage from an input source generates LC oscillation by an electrode portion L including a capacitor C and a discharge tube, and a high frequency wave is produced in the electrode portion. When the temperature of the discharge tube changes to vary L, the oscillation frequency and the voltage V across the discharge tube are varied. The variation in V is the variation in output and thus, fluctuation of the quantity of amount occurs. On the other hand, the variation in frequency provides a variation in circuit efficiency, for example, a heat loss of a diode Q, and causes a fluctuation of the quantity of light. In this manner, the variation in the temperature of the discharge tube also effects the high frequency wave oscillating circuit and therefore, the present embodiment is preferable also in this sense.

As described above, the present invention is not limited to the individual embodiments, but is based on the technical idea set forth herein and various modifications thereof would occur to mind. The present invention also covers any combination.

We claim:

1. An original reading apparatus comprising:
   a discharge tube for exposing an original, said discharge tube being adapted to emit light by a high frequency electromagnetic field being applied thereto from outside thereof;
   high frequency oscillating means for converting a low frequency wave to a high frequency wave of $10^6$ to $10^8$ Hz;
   a high frequency electrode disposed adjacent to an outer wall of said discharge tube for receiving the high frequency wave from said high frequency oscillating means and applying the high frequency electromagnetic field to said discharge tube;
   said discharge tube, high frequency oscillating means and high frequency electrode forming an unit of integral structure, said unit having shield means for shielding said unit from leakage into said unit of a high frequency noise from outside said unit; and
   drive means for reciprocally moving said unit along a predetermined path.

2. An original reading apparatus according to claim 1, wherein said high frequency wave oscillating means is movably connected to an input source fixedly provided in said original reading apparatus.

3. An original reading apparatus according to claim 1, wherein said high frequency wave applying means applies a high frequency wave of $10^6$–$4 \times 10^7$ Hz, and wherein said discharge tube is of an elongated shape, and the width of said opening in a direction intersecting the lengthwise direction thereof is less than 3 cm and more than 3 mm.

4. An original reading apparatus according to claim 1, wherein that portion of said shield means which shields said high frequency wave oscillating means has an opening therein.

5. An original reading apparatus according to claim 1, further comprising a partition member for partitioning said high frequency wave oscillating means and said discharge tube.

6. An original reading apparatus according to claim 5, wherein said partition member and that surface of the portion of said shield means for shielding said discharge tube which is adjacent to said discharge tube are reflective.

7. An original reading apparatus comprising:
   a discharge tube for exposing an original, said discharge tube being adapted to emit light by a high frequency electromagnetic field being applied thereto from outside thereof;
   high frequency oscillating means, downstream of said discharge tube, for converting a low frequency wave to a high frequency wave of $10^6$ to $10^8$ Hz;
   a high frequency electrode disposed adjacent to an outer wall of said discharge tube for receiving the high frequency wave from said high frequency oscillating means and applying the high frequency electromagnetic field to said discharge tube;
   said discharge tube, high frequency oscillating means and high frequency electrode forming an integral unit; said unit having shield means for shielding said unit from leakage into said unit of a high frequency noise from outside said unit, said shield means having an opening facing the upstream side with respect to an original scanning direction; and
   drive means for reciprocally moving said unit.

8. An original reading apparatus comprising:
   a discharge tube for exposing an original, said discharge tube being adapted to emit light by a high frequency electromagnetic field being applied thereto from outside thereof;

high frequency oscillating means for converting a low frequency wave to a high frequency wave of $10^6$ to $10^8$ Hz;

a high frequency electrode disposed adjacent to an outer wall of said discharge tube for receiving the high frequency wave from said high frequency oscillating means and applying the high frequency electromagnetic field to said discharge tube;

first shield means for shielding high frequency noise, said first shield means shielding said discharge tube, high frequency electrode and said high frequency oscillating means and having an opening for passing therethrough the light from said discharge tube; and second shield means for shielding high frequency noise, said second shield means being relatively movable between a first position for shielding said opening and a second position for opening said opening, said second shield means being moved to said second position after said discharge tube has emitted light.

9. An apparatus according to claim 8, further having a low frequency power source and wherein said high frequency wave oscillating means converts a low frequency wave into a high frequency wave, and wherein said discharge tube is shielded from said high frequency wave oscillating means by said first shield means.

10. An apparatus according to claim 8, which is an exposure source movable relative to an original used in the original reading apparatus and exposing the original.

11. An original reading apparatus comprising:

a discharge tube for exposing said original, said discharge tube being adapted to emit light by a high frequency electromagnetic field being applied thereto from outside thereof;

high frequency wave applying means for applying a high frequency electromagnetic field into said discharge tube from the outside thereof, said high frequency wave applying means comprising high frequency wave oscillating means for oscillating a high frequency wave, and transmitting means for transmitting said high frequency wave to said discharge tube;

first shield means for shielding high frequency noise, said first shield means shielding said discharge tube and said high frequency wave applying means and having an opening for passing therethrough the light from said discharge tube;

second shield means for shielding high frequency noise, said second shield means being relatively movable between a first position for shielding said opening and a second position for opening said opening; and means for moving said second shield means to said second position after said discharge tube has emitted light and for moving said second shield means between said first position and said second position in response to the relative movement of said original and said discharge tube.

12. An apparatus according to claim 11, wherein said apparatus comprises means for moving said second shield means from said first position to said second position in response to the start of the scanning of the original.

13. An apparatus according to claim 12, wherein said original reading apparatus has means for detecting the impedance of said discharge tube, wherein said apparatus starts to scan the original when the detected impedance becomes smaller than a predetermined value.

14. An apparatus according to claim 13, wherein said impedance detecting means detects the impedance between an amplifier of said tube and said transmitting means.

15. An apparatus according to claim 12, wherein said original reading apparatus has means for detecting the quantity of light of the tube, and starts to scan the original when a predetermined quantity of light is reached.

16. An apparatus according to claim 15, wherein said means for detecting the quantity of light is provided in said first shield means.

17. An apparatus according to claim 11, wherein said original reading apparatus has an original supporting table for supporting the original thereon, and said second shield means is provided on a bottom surface of said original supporting table.

18. An original reading apparatus comprising:

a discharge tube for exposing an original, said discharge tube being adapted to emit light by a high frequency electromagnetic field being applied thereto from outside thereof;

high frequency oscillating means, downstream of said discharge tube, for converting a low frequency wave to a high frequency wave of $10^6$ to $10^8$ Hz;

a high frequency electrode disposed adjacent to an outer wall of said discharge tube for receiving the high frequency wave from said high frequency oscillating means and applying the high frequency electromagnetic field to said discharge tube;

said discharge tube, high frequency oscillating means and high frequency electrode forming an integral unit; said unit having shield means for shielding said unit from leakage into said unit of a high frequency noise from outside said unit, said shield means having a first opening facing the upstream side with respect to an original scanning direction for passing therethrough the light from said discharge tube and a second opening in addition to said first opening, so that air can flow between said first and second openings; and drive means for reciprocally moving said unit.

19. An original reading apparatus according to claim 18, further having a fixed low frequency power source and wherein said high frequency power source is movably connected to said low frequency power source.

* * * * *

UNITED STATES PATENT AND TRADEMARK OFFICE
CERTIFICATE OF CORRECTION

PATENT NO. : 4,922,392
DATED : May 1, 1990
INVENTOR(S) : HIDEMI EGAMI, ET AL.

It is certified that error appears in the above-identified patent and that said Letters Patent is hereby corrected as shown below:

COLUMN 1

Line 22, "wave-" should be deleted.
    Line 23, "length of the" should be deleted.
    Line 50, "and" should be deleted.
    Line 67, "mercurly gas" should read --mercury gas--.

COLUMN 2

Line 10, "amount" should read --amount of--.

COLUMN 3

Line 31, "designted" should read --designates--.

COLUMN 5

Line 58, "and" should be deleted.

COLUMN 9

Line 11, "the" (first occurrence) should read --the turn-on--.

COLUMN 10

Line 13, "made" should read --provided--.

COLUMN 12

Line 15, "an unit" should read --a unit--.

UNITED STATES PATENT AND TRADEMARK OFFICE
CERTIFICATE OF CORRECTION

PATENT NO. : 4,922,392

DATED : May 1, 1990

INVENTOR(S) : HIDEMI EGAMI, ET AL.

It is certified that error appears in the above-identified patent and that said Letters Patent is hereby corrected as shown below:

COLUMN 13

Line 34, "said original," should read --an original,--.

Signed and Sealed this

Eleventh Day of August, 1992

Attest:

DOUGLAS B. COMER

Attesting Officer

Acting Commissioner of Patents and Trademarks